United States Patent
Wu et al.

(10) Patent No.: US 11,350,032 B2
(45) Date of Patent: May 31, 2022

(54) METHOD OF OPERATING INTRAORAL SCANNER

(71) Applicant: QISDA CORPORATION, Taoyuan (TW)

(72) Inventors: Chuang-Wei Wu, Taoyuan (TW); Tsung-Hsi Lee, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/987,417

(22) Filed: Aug. 7, 2020

(65) Prior Publication Data

US 2021/0058561 A1 Feb. 25, 2021

(30) Foreign Application Priority Data

Aug. 22, 2019 (CN) .......................... 201910780354.5

(51) Int. Cl.
| | | |
|---|---|---|
| H04N 5/232 | (2006.01) | |
| A61C 9/00 | (2006.01) | |
| H04N 5/225 | (2006.01) | |

(52) U.S. Cl.
CPC ....... *H04N 5/232411* (2018.08); *A61C 9/006* (2013.01); *H04N 5/2256* (2013.01); *H04N 2005/2255* (2013.01)

(58) Field of Classification Search
CPC .......... A61C 9/006; H04N 2005/2255; H04N 5/2256; H04N 5/232411
See application file for complete search history.

(56) References Cited

U.S. PATENT DOCUMENTS

| | | | |
|---|---|---|---|
| 10,200,572 B1* | 2/2019 | Fotland | ................... G06T 7/254 |
| 2011/0273546 A1 | 11/2011 | Lin | |
| 2018/0296080 A1* | 10/2018 | Glinec | ..................... A61B 1/24 |
| 2020/0128226 A1* | 4/2020 | Krishnamurthy | .... G06Q 10/083 |
| 2021/0012554 A1* | 1/2021 | Leonardi | .................... G06T 9/00 |
| 2021/0018318 A1* | 1/2021 | Sasaki | .................... G02B 26/10 |
| 2021/0029289 A1* | 1/2021 | Totsuka | ................. A61B 1/045 |

* cited by examiner

*Primary Examiner* — James T Boylan

(57) ABSTRACT

A method operating an intraoral scanner including a projection device of the intraoral scanner projecting a predetermined pattern, an image capture device of the intraoral scanner capturing K images of the predetermined pattern projected on an object under test, a controller of the intraoral scanner generating (K−1) overall brightness change indications according to (K−1) sets of two consecutive images of the K images, and if the (K−1) overall brightness change indications are all less than a predetermined threshold, the controller turning off the intraoral scanner. K is a positive integer greater than 1.

3 Claims, 5 Drawing Sheets

ND OF OPERATING INTRAORAL
METHOD OF OPERATING INTRAORAL SCANNER

CROSS REFERENCE TO RELATED APPLICATION

This non-provisional application claims priority of China patent application No. 201910780354.5, filed on 22 Aug. 2019, included herein by reference in its entirety.

BACKGROUND OF THE INVENTION

1. Field of the Invention

The invention relates to intraoral scanners, and in particular, to a method of operating an intraoral scanner.

2. Description of the Prior Art

An intraoral scanner employs laser light to scan teeth quickly, and then employs software to build a teeth model for use in simulation or other clinical purposes. When the tooth scan is completed or interrupted, the intraoral scanner will continue to perform ineffective light projection and image capture unless the operator actively shut down the intraoral scanner, increasing power consumption, reducing service life, inflicting blurry vision or discomfort to nearby persons owing to the continuous flickering screen, and reducing user experience.

SUMMARY OF THE INVENTION

According to one embodiment of the invention, a method operating an intraoral scanner including a projection device of the intraoral scanner projecting a predetermined pattern, an image capture device of the intraoral scanner capturing K images of the predetermined pattern projected on an object under test, a controller of the intraoral scanner generating (K−1) overall brightness change indications according to (K−1) sets of two consecutive images of the K images, and if the (K−1) overall brightness change indications are all less than a predetermined threshold, the controller turning off the intraoral scanner. K is a positive integer greater than 1.

According to another embodiment of the invention, a method operating an intraoral scanner including a projection device of the intraoral scanner projecting a predetermined pattern, an image capture device of the intraoral scanner capturing K images of the predetermined pattern projected on an object under test, a controller of the intraoral scanner generating K sets of vertices according to the K images, the controller counting K quantities of vertices of the K sets of vertices; the controller generating (K−1) differences according to two consecutive quantities of vertices of the K quantities of vertices, the controller comparing the (K−1) differences to a predetermined vertex change threshold to generate (K−1) overall vertex change indications, and if the (K−1) overall vertex change indications indicate that the (K−1) differences are all less than the predetermined vertex threshold, the controller turning off the intraoral scanner. K is a positive integer greater than 1.

According to another embodiment of the invention, a method operating an intraoral scanner including a projection device of the intraoral scanner projecting a predetermined pattern, an image capture device of the intraoral scanner capturing K images of the predetermined pattern projected on an object under test, a controller of the intraoral scanner generating (K−1) overall brightness change indications according to (K−1) sets of two consecutive images of the K images, the controller generating K sets of vertices according to the K images, the controller computing K quantities of vertices of the K sets of vertices, the controller generating (K−1) differences according to two consecutive quantities of vertices of the K quantities of vertices, the controller comparing the (K−1) differences to a predetermined vertex change threshold to generate (K−1) overall vertex change indications, the controller computing a weighted sum of the (K−1) overall brightness change indications and the (K−1) overall vertex change indications, and if the weighted sum is less than a predetermined threshold, the controller turning off the intraoral scanner. K is a positive integer greater than 1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
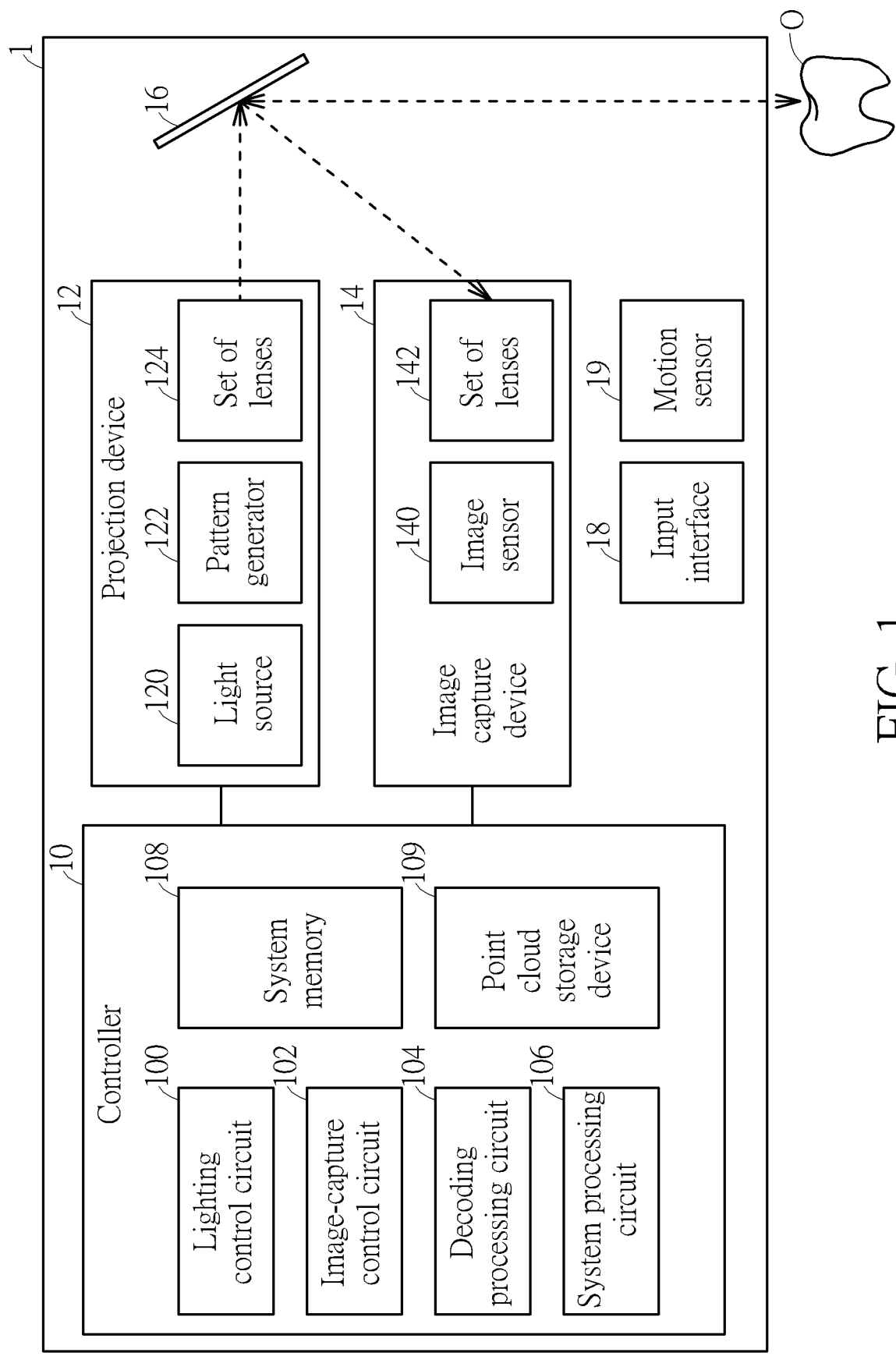
FIG. 1 is a block diagram of an intraoral scanner according to an embodiment of the invention.

FIG. 1 is a block diagram of an intraoral scanner 1 according to an embodiment of the invention. The intraoral scanner 1 may detect an idle state upon activation, and may be turned off in the idle state, achieving power saving and optimizing user experience. The intraoral scanner 1 may include a controller 10, a projection device 12, an image capture device 14 and a reflective mirror 16. The controller 10 may be coupled to the projection device 12 and the image capture device 14.

The controller 10 may include a lighting control circuit 100, an image-capture control circuit 102, a decoding processing circuit 104, a system processing circuit 106, a system memory 108 and a point cloud storage device 109. The lighting control circuit 100 may control the projection device 12 to project one or more predetermined patterns. The projection device 12 may include a light source 120, a pattern generator 122 and a set of lenses 124. The light source 120 may be a laser light source for use to generate infrared light, red light, blue light, green light or light at other wavelengths. The pattern generator 122 may include a digital micromirror device (DMD), a dynamic grating generation device or a fixed grating generation device, for use to generate the predetermined pattern. The predetermined pattern may be a structured light pattern such as a grid, a stripe, a circle, a cross pattern, a gray code pattern, a color code pattern, other coding patterns or random patterns. The set of lenses 124 may guide the predetermined pattern projected with the light beam towards the reflective mirror 16, and the reflective mirror 16 may reflect the predetermined pattern onto a surface of an object under test O, e.g., teeth.

The image-capture control circuit 102 may control the image capture device 14 to capture a two-dimensional image of the predetermined pattern projected on the surface of the object under test O. When the predetermined pattern is projected on the surface of the object under test O having different shapes, patterns and/or depths, a deformation may occur. The two-dimensional image may include a deformed predetermined pattern, and may include grayscale values of a plurality of pixels. The image capture device 14 may include an image sensor 140 and a set of lenses 142. After the projected predetermined pattern is reflected from the object under test O to hit the reflective mirror 16 again, the reflected predetermined pattern is guided by the set of lenses 142 to the image sensor 140 for the image sensor 140 to capture the two-dimensional image. The system memory 108 may store the two-dimensional image. The decoding processing circuit 104 may compute three-dimensional location information of features on the surface of the object under test O according to the original predetermined pattern and the deformed predetermined pattern, and set the three-dimensional location information of the features on the surface of the object under test O as vertices, or set the three-dimensional location information of the features on the surface of the object under test O in a predetermined depth range or a predetermined spatial range as the vertices. The point cloud storage device 109 may store a set of vertices of the object under test O, referred to as a point cloud.

The system processing circuit 106 may determine whether the intraoral scanner 1 is in an idle state according to a plurality of sequentially captured two-dimensional images. When the intraoral scanner 1 is in an idle state, the system processing circuit 106 may turn off the main power and only keep the backup power of the intraoral scanner 1 active to shut down, e.g., the projection device 12, the image capture device 14, the lighting control circuit 100, the image-capture control circuit 102, the decoding processing circuit 104, the system memory 108 and/or the point cloud storage device 109, so as to set the intraoral scanner 1 in a power-saving state. The intraoral scanner 1 may further include an input interface 18. When it is required to reactivate the intraoral scanner 1, the input interface 18 may receive a user input command to restore the main power. Alternatively, the intraoral scanner 1 may further include a motion sensor 19 for use to sense a movement of the intraoral scanner 1 to wake up the same to restore the main power.

Figure 2:
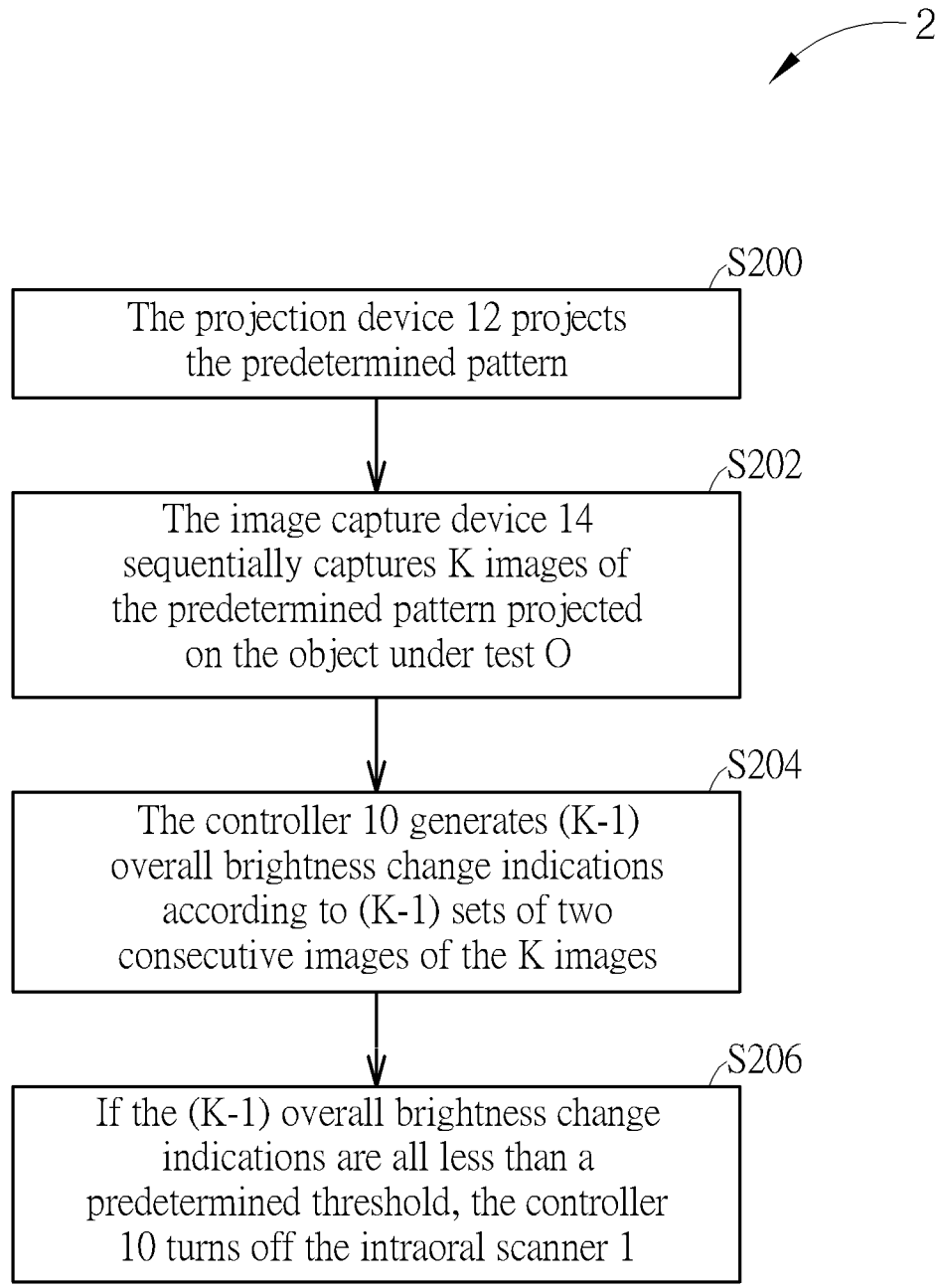
FIG. 2 is a flowchart of a method of operating the intraoral scanner in FIG. 1.

FIG. 2 is a flowchart of an operating method 2 of operating the intraoral scanner 1. The operating method 2 includes Steps S200 to S206. Steps S200 to S204 are used to generate an overall brightness change indication. Step S206 is used to turn off the intraoral scanner 1 when the overall brightness change indication is less than a predetermined value. Any reasonable step change or adjustment is within the scope of the disclosure. Steps S200 to S206 are detailed as follows:

Step S200: The projection device 12 projects the predetermined pattern;

Step S202: The image capture device 14 sequentially captures K images of the predetermined pattern projected on the object under test O;

Step S204: The controller 10 generates (K−1) overall brightness change indications according to (K−1) sets of two consecutive images of the K images;

Step S206: If the (K−1) overall brightness change indications are all less than a predetermined threshold, the controller 10 turns off the intraoral scanner 1.

Upon a user activating the intraoral scanner 1 to scan, the projection device 12 projects the predetermined pattern onto the object under test O, e.g., a tooth (S200). Then the image capture device 14 sequentially captures K images of the predetermined pattern projected on the object under test O (S202). The (k−1)th image includes a plurality of grayscale values $G_{k-1}(x, y)$ of a plurality of pixels (1, 1) to (X, Y), the kth image includes a plurality of grayscale values $G_k(x, y)$ of the plurality of pixels (1, 1) to (X, Y), wherein k is an image sampling count index ranging from 2 to K, x is a horizontal coordinate ranging from 1 to X, y is a vertical coordinate ranging from 1 to Y, k, K, X and Y are positive integers. The image capture device 14 captures the (k−1)th image and the kth image at a predetermined sampling interval, e.g., 1 s.

Next, the controller 10 generates (K−1) overall brightness change indications $I'_1$ to $I'_{K-1}$ according to (K−1) sets of two consecutive images of the K images (S204). Specifically, the controller 10 first computes X×Y absolute differences between a plurality of grayscale values $G_{k-1}(x, y)$ of the plurality of pixels (1, 1) to (X, Y) of the (k−1)th image and a plurality of corresponding grayscale values $G_k(x, y)$ of the plurality of pixels (1, 1) to (X, Y) of the kth image, and compares the X×Y absolute differences to a predetermined brightness change threshold $I_{GTH}$ to generate a plurality of pixel brightness changes $I_{k-1}(x, y)$, as expressed in Equation 1:

$$I_{k-1}(x, y) = \begin{cases} 1, & \text{if } \text{abs}(G_k(x, y) - G_{k-1}(x, y)) > I_{GTH} \\ 0, & \text{otherwise} \end{cases} \quad \text{Equation 1}$$

The pixel brightness changes $I_{k-1}(x, y)$ may be 1 or 0, the pixel brightness change $I_{k-1}(x, y)$ being 1 represents a brightness change of a pixel (x, y) exceeds the predetermined brightness change threshold $I_{GTH}$, indicating that a change in the brightness of the pixel (x, y) has occurred; the pixel brightness change $I_{k-1}(x, y)$ being 0 represents the brightness change of the pixel (x, y) is less than or equal to the predetermined brightness change threshold $I_{GTH}$, indicating that a change in the brightness of the pixel (x, y) has not occurred. Then, the controller 10 counts the number of pixels in the plurality of pixels (1, 1) to (X, Y) that has changed in brightness, and set the number of pixels as the overall brightness change indication $I'_{k-1}$, as expressed in Equation 2:

$$I'_{k-1} = \sum_{x=1}^{X} \sum_{y=1}^{Y} (I_{k-1}(x, y)) \quad \text{Equation 2}$$

The (K−1) overall brightness change indications $I'_1$ to $I'_{K-1}$ may be generated according to the K images, Equation (1) and Equation (2).

If after capturing the K images, the (K−1) overall brightness change indications $I'_1$ to $I'_{K-1}$ are all less than the predetermined threshold, then there is no change in the brightness of the K images, and it can be determined that the intraoral scanner 1 is in the idle state, and consequently, the controller 10 will turn off the intraoral scanner 1 (S206). If after capturing the K images, at least one of the (K−1) overall brightness change indications $I'_1$ to $I'_{K-1}$ exceeds or is equal to the predetermined threshold, a change in the brightness has occurred in the K images, it can be determined that the intraoral scanner 1 is in an operating state, and therefore, the controller 10 will not turn off the intraoral scanner 1.

Figure 3:
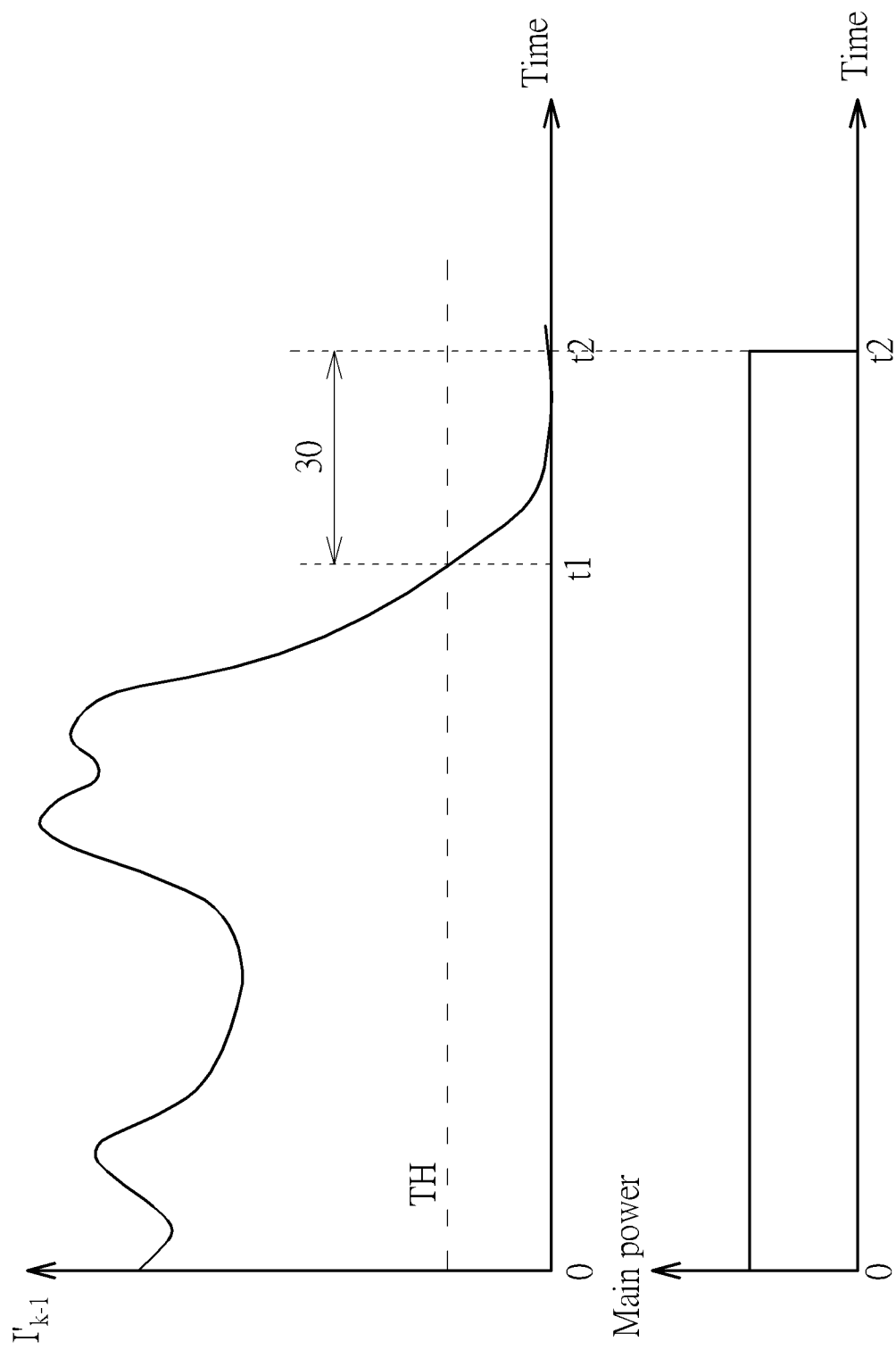
FIG. 3 is a schematic diagram of a relationship of the overall brightness change indication and the main power of the intraoral scanner in FIG. 1 over a period.

FIG. 3 is a schematic diagram of a relationship of the overall brightness change indication $I'_{k-1}$ and the main power of the intraoral scanner 1 over a period. Between Time 0 to t1, the overall brightness change indications $I'_{k-1}$ exceeds the predetermined threshold TH, thus it can be determined that the intraoral scanner 1 is in operation, the main power remains active to supply power to the intraoral scanner 1. At Time t1, the overall brightness change indication $I'_{k-1}$ starts getting less than the predetermined threshold TH and continues to be less than the predetermined threshold TH for K consecutive images, thus it can be determined that the intraoral scanner 1 is in the idle state, and at Time t2, the main power of the intraoral scanner 1 may be turned off, achieving power-saving and optimizing user experience.

Figure 4:
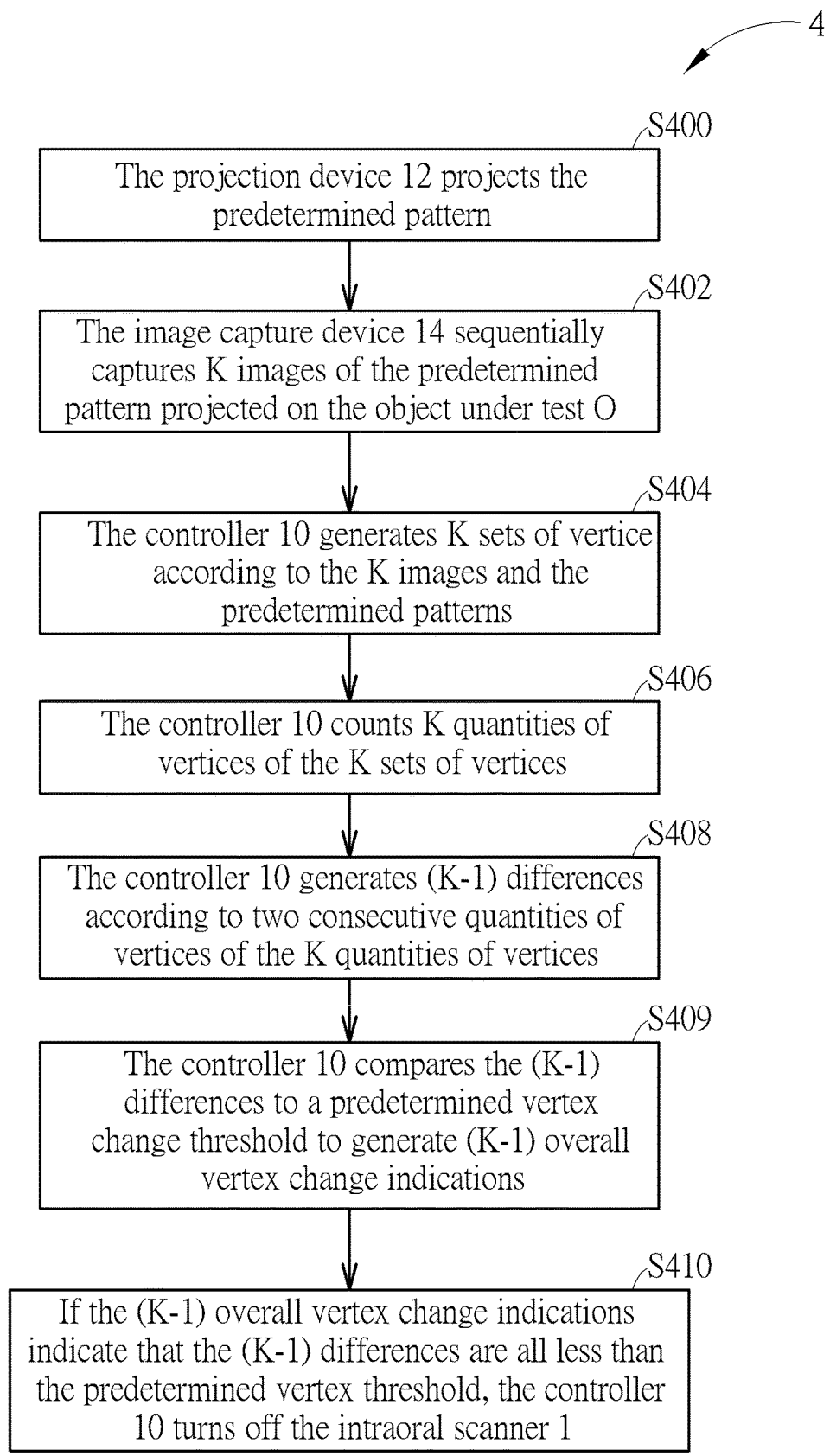
FIG. 4 is a flowchart of another method of operating the intraoral scanner in FIG. 1.

FIG. 4 is a flowchart of another operating method 4 of operating the intraoral scanner 1. Steps S400 to S408 are used to generate a difference of respective quantities of two sets of vertices. Step S410 is used to turn off the intraoral scanner 1 when the difference is less than a predetermined threshold. Any reasonable step change or adjustment is within the scope of the disclosure. Steps S400 to S410 are detailed as follows:

Step S400: The projection device 12 projects the predetermined pattern;

Step S402: The image capture device 14 sequentially captures K images of the predetermined pattern projected on the object under test O;

Step S404: The controller 10 generates K sets of vertices according to the K images and the predetermined patterns;

Step S406: The controller 10 counts K quantities of vertices of the K sets of vertices;

Step S408: The controller 10 generates (K−1) differences according to two consecutive quantities of vertices of the K quantities of vertices;

Step S409: The controller 10 compares the (K−1) differences to a predetermined vertex change threshold to generate (K−1) overall vertex change indications;

Step S410: If the (K−1) overall vertex change indications indicate that the (K−1) differences are all less than the predetermined vertex threshold, the controller 10 turns off the intraoral scanner 1.

Steps S400 and S402 are identical to Steps S200 and S202, explanation therefor will be omitted for brevity. The decoding processing circuit 104 of the controller 10 generates the K sets of vertices according to the K images and the predetermined patterns (S404), and counts K quantities $V_1$ to $V_K$ of vertices of the K sets of vertices (S406). Next, the controller generates (K−1) differences ($V_k - V_{k-1}$) according to two consecutive quantities $V_{k-1}$, $V_k$ of vertices of the K quantities $V_1$ to $V_K$ of vertices, where k is an image sampling count index ranging from 2 to K (S408). Then, the controller 10 compares the (K−1) differences ($V_k - V_{k-1}$) to the predetermined vertex change threshold to generate (K−1) overall vertex change indications $V'_{k-1}$ (S409), as expressed in Equation 3:

$$V'_{k-1}(x, y) = \begin{cases} 1, & \text{if } abs(V_k - V_{k-1}) \geq V_{TH} \\ 0, & \text{otherwise} \end{cases} \quad \text{Equation 3}$$

The overall vertex change indications $V'_{k-1}$ may be 1 or 0.

If after capturing K images, the (K−1) differences ($V_k - V_{k-1}$) are all less than the predetermined vertex change threshold, the (K−1) overall vertex change indications $V'_{k-1}$ are all equal to 0, the quantities of vertices of the K images are almost unchanged, it can be determined that the intraoral scanner 1 is in the idle state, and the controller 10 will turn off the intraoral scanner 1 (S410). If at least one of the (K−1) overall vertex change indications $V'_{k-1}$ in the captured K images is equal to 1, it can be regarded as a change in the quantities of the vertices of the K images has occurred, the intraoral scanner 1 is in the operating state, and the controller 10 will not turn off the intraoral scanner 1.

Figure 5:
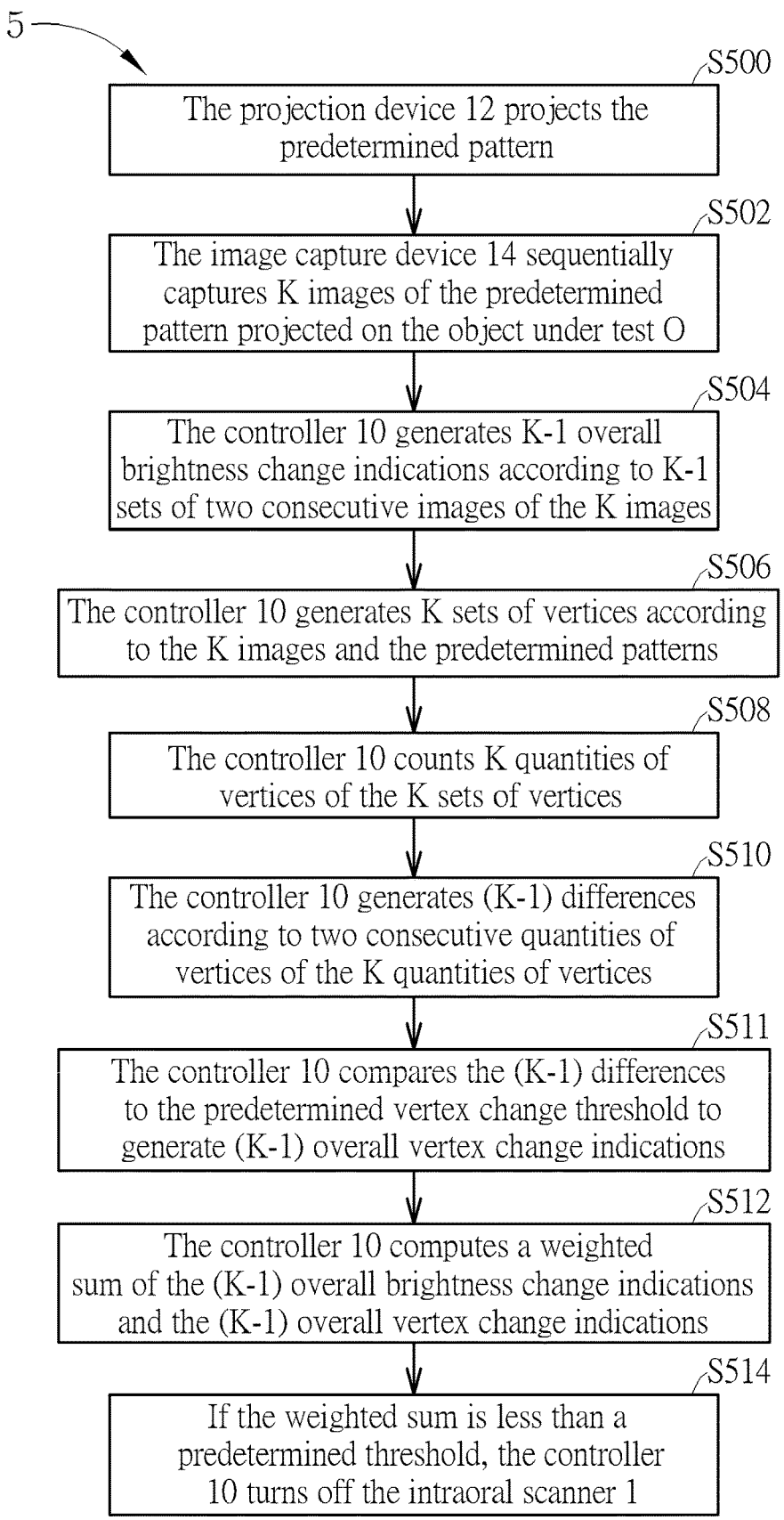
FIG. 5 is a flowchart of another method of operating the intraoral scanner in FIG. 1.

FIG. 5 is a flowchart of another operating method 5 of operating the intraoral scanner 1. Steps S500 to S504 are used to generate the overall brightness change indications. Steps S506 to S511 are used to generate the overall vertex change indications. Step S512 is used to compute a weighted sum of the overall brightness change indications and the overall vertex change indications. Step S514 is used to turn off the intraoral scanner 1 in the idle state. Any reasonable step change or adjustment is within the scope of the disclosure. Steps S500 to S514 are detailed as follows:

Step S500: The projection device 12 projects the predetermined pattern;

Step S502: The image capture device 14 sequentially captures K images of the predetermined pattern projected on the object under test O;

Step S504: The controller 10 generates K−1 overall brightness change indications according to K−1 sets of two consecutive images of the K images;

Step S506: The controller 10 generates K sets of vertices according to the K images and the predetermined patterns;

Step S508: The controller 10 counts K quantities of vertices of the K sets of vertices;

Step S510: The controller 10 generates (K−1) differences according to two consecutive quantities of vertices of the K quantities of vertices;

Step S511: The controller 10 compares the (K−1) differences to the predetermined vertex change threshold to generate (K−1) overall vertex change indications;

Step S512: The controller 10 computes a weighted sum of the (K−1) overall brightness change indications and the (K−1) overall vertex change indications;

Step S514: If the weighted sum is less than a predetermined threshold, the controller 10 turns off the intraoral scanner 1.

Steps S500 and S504 are identical to Steps S200 and S204, Steps S506 and S511 are identical to Steps S404 and S409, explanation therefor will be omitted for brevity. In Step S512, the controller 10 computes a weighted sum E of the (K−1) overall brightness change indications $I'_1$ to $I'_{K-1}$ and the (K−1) overall vertex change indications $V'_1$ to $V'_{K-1}$, as expressed in Equation 4:

$$E = W_I \sum_{k=2}^{K} I'_{k-1} + W_V \sum_{k=2}^{K} bV'_{k-1} \quad \text{Equation 4}$$

where E is the weighted sum;

$I'_{k-1}$ is the (k−1)th overall brightness change indication;

$V'_{k-1}$ is the (k−1)th overall vertex change indication;

W1 is a brightness change weight;

W2 is a vertex change weight;

k is the image sampling count index;

K is a sample size of images taken consecutively over a period of time; and b is a constant.

When the weighted sum E is less than a predetermined threshold, there is almost no change in the K consecutive images, the intraoral scanner 1 is in the idle state, and therefore, the controller 10 may turn off the intraoral scanner 1 (S514). When the weighted sum E exceeds or is equal to the predetermined threshold, a change has occurred in the K consecutive images, the intraoral scanner 1 is in the operating state, and therefore, the controller 10 may not turn off the intraoral scanner 1. The predetermined threshold adopted in the operating method 5 may be identical or different from that adopted in the operating method 2.

The operating method 2, 4 and 5 are used to determine whether the intraoral scanner 1 is in the idle state by the overall brightness change indications and/or the differences between the quantities of vertices of the 2D images, and turn off the intraoral scanner 1 in the idle state, achieving power saving and optimizing user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating an intraoral scanner, the method comprising:
   - a projection device of the intraoral scanner projecting a predetermined pattern;
   - an image capture device of the intraoral scanner capturing K images of the predetermined pattern projected on an object under test;
   - a controller of the intraoral scanner generating (K−1) overall brightness change indications according to (K−1) sets of two consecutive images of the K images;
   - the controller generating K sets of vertices according to the K images;
   - the controller computing K quantities of vertices of the K sets of vertices;
   - the controller generating (K−1) differences according to two consecutive quantities of vertices of the K quantities of vertices;
   - the controller comparing the (K−1) differences to a predetermined vertex change threshold to generate (K−1) overall vertex change indications;
   - the controller computing a weighted sum of the (K−1) overall brightness change indications and the (K−1) overall vertex change indications; and
   - if the weighted sum is less than a predetermined threshold, the controller turning off the intraoral scanner;
   - wherein K is a positive integer greater than 1.

2. The method of claim 1, wherein the controller of the intraoral scanner generating the (K−1) overall brightness change indications according to the (K−1) sets of two consecutive images of the K images comprises:
   - the controller computing a plurality of absolute differences between a plurality of grayscale values of a kth image of the K images and a plurality of corresponding grayscale values of a (k−1)th image of the K images; and
   - the controller counting a quantity of absolute differences in the plurality of absolute differences exceeding a predetermined brightness change threshold as a (k−1)th overall brightness change indication of the (K−1) overall brightness change indications;
   - where K≥k≥2 and k is an integer.

3. The method of claim 1, wherein the image-capture device is configured to capture the K images at intervals of a predetermined sampling period.

* * * * *